US008380388B2

(12) United States Patent
Shin et al.

(10) Patent No.: US 8,380,388 B2
(45) Date of Patent: Feb. 19, 2013

(54) METHOD AND APPARATUS FOR MONITORING A STARTER MOTOR FOR AN INTERNAL COMBUSTION ENGINE

(75) Inventors: Kwang-Keun Shin, Rochester Hills, MI (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 455 days.

(21) Appl. No.: 12/791,817

(22) Filed: Jun. 1, 2010

(65) Prior Publication Data

US 2011/0295459 A1 Dec. 1, 2011

(51) Int. Cl.
*G01M 17/00* (2006.01)

(52) U.S. Cl. ...................................... 701/29.2; 701/29.1

(58) Field of Classification Search ......... 701/29.1–29.2
See application file for complete search history.

(56) References Cited

U.S. PATENT DOCUMENTS

| | | | | |
|---|---|---|---|---|
| 3,839,906 | A | 10/1974 | Hanson | |
| 6,035,626 | A * | 3/2000 | Wahl et al. | 60/773 |
| 6,178,736 | B1 * | 1/2001 | Massey | 60/779 |
| 2004/0123587 | A1 * | 7/2004 | Kamiya et al. | 60/284 |
| 2007/0068476 | A1 * | 3/2007 | Asada | 123/179.24 |
| 2008/0053777 | A1 * | 3/2008 | Kamei et al. | 192/45 |
| 2009/0241884 | A1 * | 10/2009 | Saitoh et al. | 123/179.4 |
| 2009/0309530 | A1 | 12/2009 | Shin | |

* cited by examiner

*Primary Examiner* — Hussein A. Elchanti

(57) ABSTRACT

A method for monitoring a starter motor for an internal combustion engine includes calculating a first engine power during a starting event based on an electric power flow from the battery to the starter motor, calculating a second engine power during the starting event based on an engine kinetic energy, and detecting a fault associated with the starter motor as a function of the difference between the first engine power and the second engine power.

14 Claims, 4 Drawing Sheets

METHOD AND APPARATUS FOR MONITORING A STARTER MOTOR FOR AN INTERNAL COMBUSTION ENGINE

TECHNICAL FIELD

This disclosure is related to starting systems for internal combustion engines.

BACKGROUND

The statements in this section merely provide background information related to the present disclosure and may not constitute prior art.

An internal combustion engine may employ a starter motor that electrically couples to a vehicle battery. Battery power is provided to the starter motor in response to, e.g., activation of an ignition switch, causing rotation of a starter motor shaft to effect rotation of a crankshaft of the engine.

The starter motor may include an armature coil, a stator, brushes, bearings, a solenoid, and other components. The starter motor connects to the battery and ignition system via wiring harnesses. A fault in the starter motor or wiring harness can affect operation of the starter motor, and result in the engine not starting. Faults include, e.g., a dirty or corroded brush, a short circuit of the armature coil, and a weakened motor magnetic field as a result of degradation of a permanent magnet in the motor.

SUMMARY

A method for monitoring a starter motor for an internal combustion engine includes calculating a first engine power during a starting event based on an electric power flow from the battery to the starter motor, calculating a second engine power during the starting event based on an engine kinetic energy, and detecting a fault associated with the starter motor as a function of the difference between the first engine power and the second engine power.

BRIEF DESCRIPTION OF THE DRAWINGS

One or more embodiments will now be described, by way of example, with reference to the accompanying drawings, in which.

DETAILED DESCRIPTION

Figure 1:
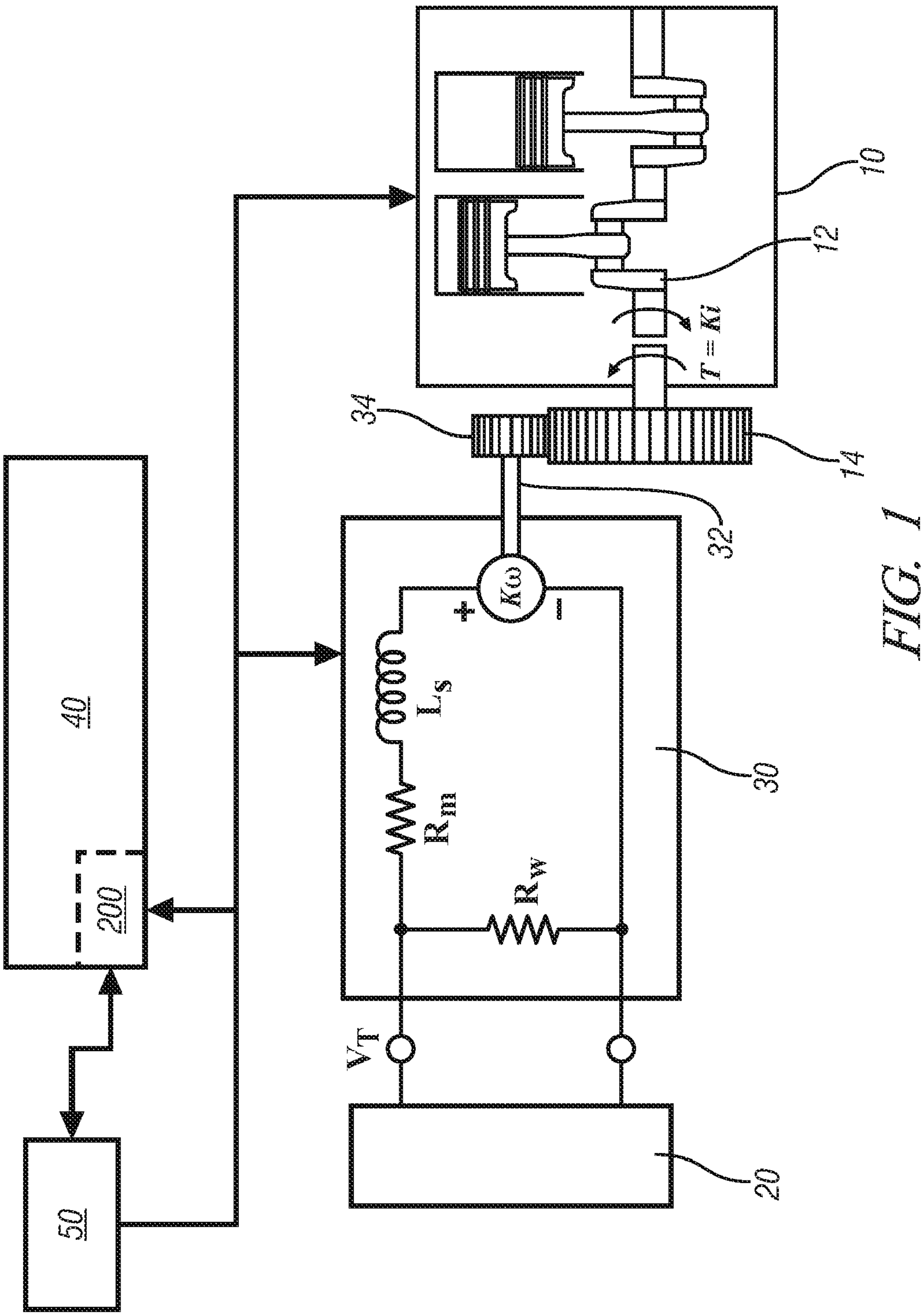
FIG. 1 schematically illustrates a starting system for an internal combustion engine, including a battery and starter motor in accordance with the disclosure.

Referring now to the drawings, wherein the showings are for the purpose of illustrating certain exemplary embodiments only and not for the purpose of limiting the same, FIG. 1 schematically illustrates a starting system for an internal combustion engine 10 that includes a battery 20 electrically connected via cables to a starter motor 30. A controller 40 is signally and operatively connected to the engine 10, the battery 20, and the starter motor 30, and executes control schemes including control scheme 200 to monitor and control operation of the engine 10 in response to operator inputs. The starter motor 30 includes an electrical circuit represented by a motor resistor ($R_m$), a motor inductance ($L_S$), electric motor ($K\omega$) and a shorting resistance ($R_W$) to indicate presence of a fault, if any. The starter motor 30 includes a rotatable output shaft 32 coupled to a multitooth gear 34. The internal combustion engine 10 includes a crankshaft 12 coupled to a rotatable element 14 having a plurality of teeth. In one embodiment, a solenoid device on the starter motor 30 projects the multitooth gear 34 outwardly to meshingly engage the teeth of the rotatable element 14 of the engine 10 during cranking. An ignition switch 50 operatively connects to the starter motor 30 and preferably signally connects to the controller 40. In operation, an operator activates the ignition switch 50 to crank the engine 10. It is appreciated that the controller 40 can crank the engine to effect engine starting using an autostart control scheme subsequent to an autostop event during ongoing operation when the engine 10 is so configured.

Electric power is transferred to the starter motor 30 and converted to torque that is applied to the rotatable output shaft 32 during engine cranking. The applied torque rotates the output shaft 32 and the projected multitooth gear 34 that is meshingly engaged with the teeth of the rotatable element 14 of the engine 10 to turn the crankshaft 12 and spin the engine 10. The engine controller 40 coincidentally activates a fuel system to fuel the engine 10 and in one embodiment activates a spark ignition system to fire the engine 10 to effect engine starting. Once it is determined that the engine 10 has started and is generating torque, the starter motor 30 is deactivated by discontinuing electric power thereto, including retracting the projected multitooth gear 34.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 40 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The controller 40 executes the control scheme 200 to monitor operation of the starter motor 30 to detect a state of health which may include prognosis (i.e. detection of performance degradation indicative of impending faults) or diagnosis of active faults associated therewith. The control scheme 200 includes monitoring electric power flow from the battery 20 to the starter motor 30 during engine starting events (starting events). Engine power during starting events may be determined based on the monitored electric power flow from the battery 20 to the starter motor 30. Engine power during starting events also may be determined based on known engine kinetics. Starter motor prognosis is based upon the correlation of the engine power determined based on monitored electric power flow from the battery and engine power determined based on engine kinetics. Preferably, the control scheme 200 executes during each starting event.

Figure 2:
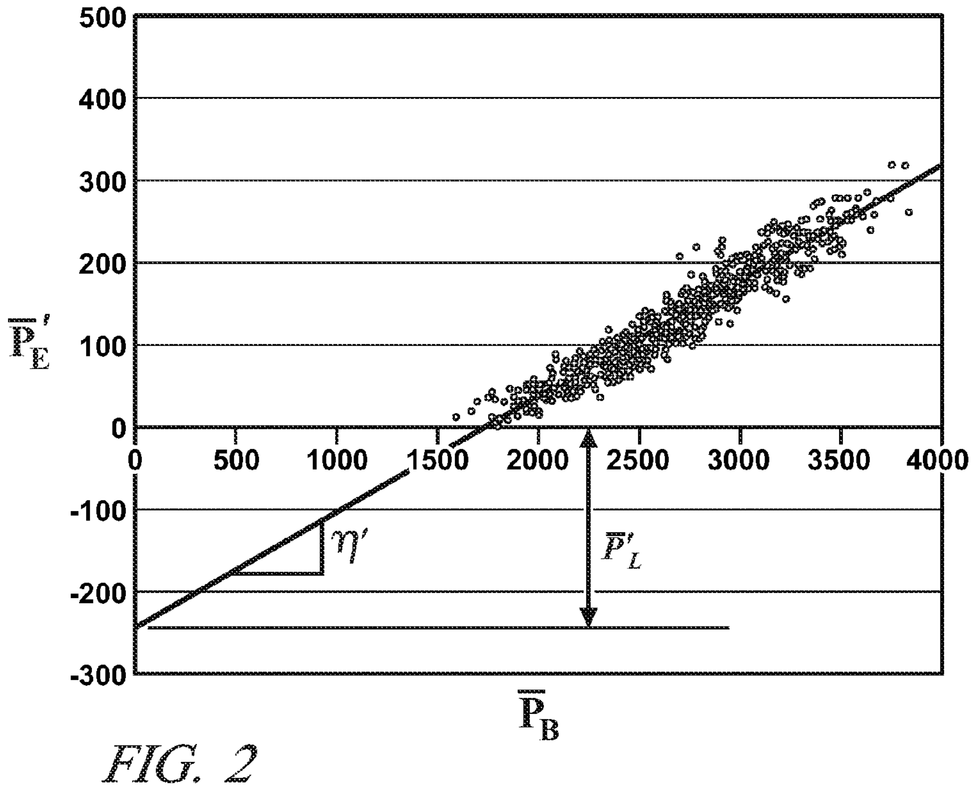
FIG. 2 graphically shows cranking data exhibiting a relationship between battery power and engine power during cranking in accordance with the present disclosure.

FIG. 2 graphically shows plotted cranking data for an exemplary system using different battery devices and different starting conditions that exhibits a relationship between average battery power load (i.e. electric power flow from the battery to the starter motor) ($\overline{P}_B$) in Watts and average engine power normalized for engine inertia ($\overline{P}_E'$) during engine starting events. The results depict the averaged normalized engine power and corresponding averaged battery power, wherein engine power and battery power are measured during starting events. Starting event as used herein refers to engine cranking from initiation until engine speed reaches a first local minimum speed subsequent to a first local maximum speed.

Applicants have thus demonstrated a linear relationship between engine power and battery power during starting events as follows:

$$\overline{P}_{Eb}=\eta\cdot\overline{P}_B-\overline{P}_L \quad [1]$$

wherein $\overline{P}_{Eb}$ is the average engine power during starting events based upon battery power load during the starting event, $\eta$ is energy efficiency associated with converting electric power to mechanical power, $\overline{P}_B$ is the average battery power load during starting events, and $\overline{P}_L$ is the average engine load during starting events.

The average engine load ($\overline{P}_L$) is a measure of amount of power in the form of torque which must be overcome to crank the engine 10 during a starting event, and is associated with static and dynamic bearing friction, combustion chamber compression, and other factors associated with a particular engine. The energy efficiency $\eta$ is a known design quantity for the particular electrical system including the starter motor, battery and associated wiring. The average engine load ($\overline{P}_L$) correlates to temperature, and energy efficiency $\eta$ may similarly correlate to temperature. In one embodiment, a plurality of average engine loads ($\overline{P}_L$) and energy efficiencies ($\eta$) correlated to a plurality of engine temperatures (e.g. engine coolant temperature) are predetermined (such as through calibration testing) and stored as a vector in a memory device in the controller 40 for access by the control scheme 200. It is appreciated that the energy efficiency ($\eta$) and the average engine load ($\overline{P}_L$) are independent of the battery state.

Thus, one having ordinary skill in the art can appreciate that engine power during a starting event may be determined as a function of battery power during the starting event, engine load during the starting event and system energy efficiency associated with converting electric power to mechanical power.

The linear relationship between engine power and battery power during starting events may be normalized using a rotational moment of inertia of the engine which is a known design quantity for the particular engine application. Rotational moment of inertia of the engine may be determined through measurements or known dynamic calculations. Normalization of Eq. 1 relative to units of rotational moment of inertia is set forth below:

$$\left(\frac{\overline{P}_{EB}}{J_E}\right)=\left(\frac{\eta}{J_E}\right)\cdot\overline{P}_B-\left(\frac{\overline{P}_L}{J_E}\right) \quad [2]$$

wherein $J_E$ is the rotational moment of inertia of the engine, $$\left(\frac{\overline{P}_{EB}}{J_E}\right)=\overline{P}'_{Eb}$$

is the normalized average engine power during to starting events based upon the battery power load during the starting event, $$\left(\frac{\eta}{J_E}\right)=\eta'$$

is the normalized energy efficiency associated with converting electric power to mechanical power, $\overline{P}_B$ is the average battery power load during starting events, and $$\left(\frac{\overline{P}_L}{J_E}\right)=\overline{P}'_L$$

is the normalized average engine load during starting events. Therefore, Eq. 2 may be expressed as follows:

$$\overline{P}_{Eb}'=\eta'\cdot\overline{P}_B-\overline{P}_L' \quad [3]$$

The average engine power during a starting event also may be calculated based on the kinetic energy of the engine. The kinetic energy of the engine during the starting event is calculated as follows:

$$K_E(t)=\frac{1}{2}J_E\Omega_E^2(t) \quad [4]$$

wherein $K_E(t)$ is the kinetic energy of the engine during starting events at time (t), $J_E$ is the rotational moment of inertia of the engine, and $\Omega_E$ is engine angular velocity derived from measured engine speed (rpm).

Thus, the average engine power during the starting event may be determined as follows:

$$\overline{P}_{E\alpha}=\frac{K_E(t_1)}{(t_1-t_0)}=\frac{1}{(t_1-t_0)}\left(\frac{1}{2}J_E\Omega_E^2(t_1)\right) \quad [5]$$

wherein $\overline{P}_{E\alpha}$ is the average engine power during starting events based on the kinetic energy of the engine, time ($t_0$) corresponds to the initial time at which engine cranking starts, time ($t_1$) corresponds to the time at which engine speed reaches the first local minimum speed subsequent to the first local maximum speed subsequent to time ($t_0$), $J_E$ is the rotational moment of inertia of the engine, and $\Omega_E$ is engine angular velocity derived from measured engine speed (rpm).

Eq. 5 may be normalized as a function of the rotational moment of inertia of the engine and reduced to a normalized engine power for cranking an engine during a starting event as follows:

$$\overline{P}'_{Ea} = \frac{P_{Ea}}{J_E} = \frac{1}{(t_1 - t_0)}\left(\frac{1}{2}\Omega_E^2(t_1)\right) \quad [6]$$

wherein $\overline{P}_{E\alpha}$ is the normalized average engine power during starting events based on the kinetic energy of the engine, $\overline{P}_{E\alpha}$ is the average engine power during starting events based on the kinetic energy of the engine, $J_E$ is the rotational moment of inertia of the engine, time ($t_0$) corresponds to the initial time at which engine cranking starts, time ($t_1$) corresponds to the time at which engine speed reaches the first local minimum speed subsequent to the first local maximum speed subsequent to time ($t_0$), and $\Omega_E$ is engine angular velocity derived from measured engine speed (rpm).

Figure 3A:
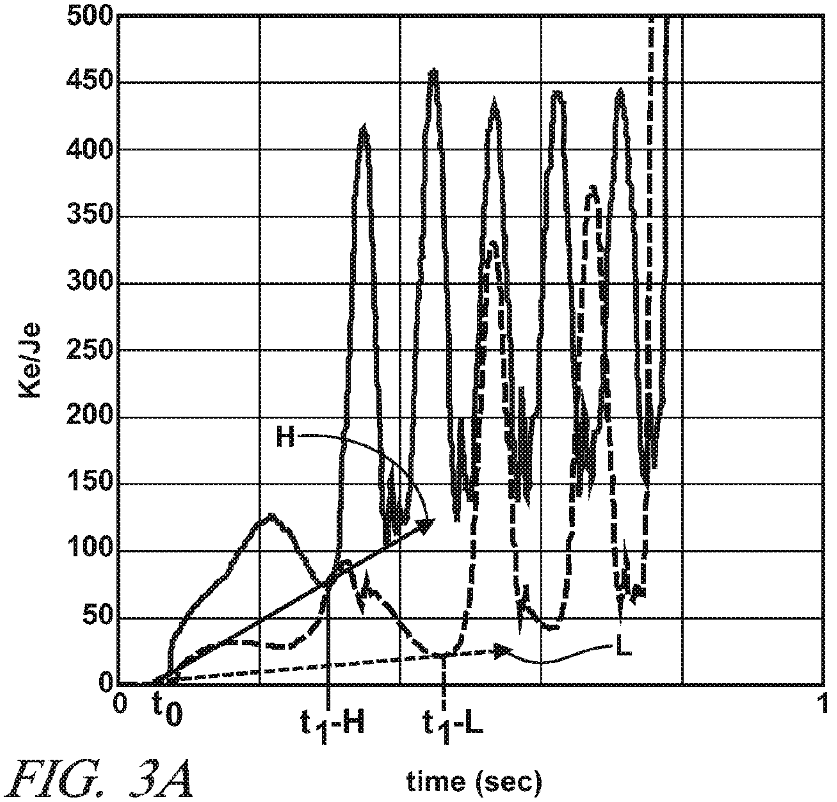
FIG. 3A graphically shows exemplary data of average engine power during a starting event over elapsed time for a low power cranking event and a high power cranking event in accordance with the present disclosure.

It is appreciated that a relatively lower cranking speed has a corresponding lower average engine power for cranking, whereas a relatively higher cranking speed has a corresponding higher average engine power for cranking. FIG. 3A graphically shows exemplary data of normalized engine power during starting events over elapsed times corresponding to low power cranking (L) and high power cranking (H). Depicted time ($t_1$-L) corresponds to the point engine speed reaches the first local minimum speed subsequent to the first local maximum speed subsequent to time ($t_0$) for the low power cranking (L). Similarly, depicted time ($t_1$-H) the point engine speed reaches the first local minimum speed subsequent to the first local maximum speed subsequent to time ($t_0$) for the high power cranking (H). Average normalized engine power during such starting events based on kinetic energy of the engine ($\overline{P}_{E\alpha}'$) may be determined.

The average battery power load during the starting event can be calculated as follows:

$$\overline{P}_B = \frac{1}{t_1 - t_0}\int_{t_0}^{t_1} I_B(t)V_B(t)dt \quad [7]$$

wherein $\overline{P}_B$ is the average battery power load during the starting event, time ($t_0$) corresponds to the initial time at which engine cranking starts, time ($t_1$) corresponds to the time at which engine speed reaches the first local minimum speed subsequent to the first local maximum speed subsequent to time ($t_0$), $I_B$ is battery current, and $V_B$ is battery voltage.

Figure 3B:
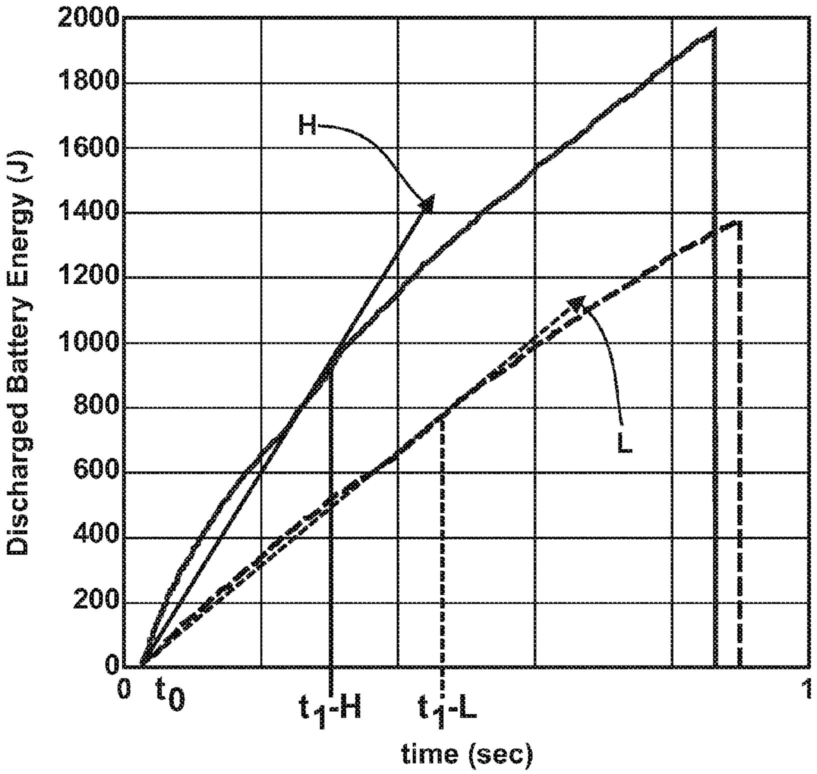
FIG. 3B graphically shows exemplary data of average battery power during cranking over elapsed time for a low power cranking event and a high power cranking event in accordance with the present disclosure.

FIG. 3B graphically shows exemplary data depicting average battery cranking power discharged during starting events corresponding to low power cranking (L) and high power cranking (H), with times ($t_1$-L) and ($t_1$-H) corresponding to points in time at which engine speed reaches the first local minimum speed subsequent to the first local maximum speed subsequent to time ($t_0$) for the low power cranking (L) and high power cranking (H), respectively. Average battery power load during such starting events ($\overline{P}_B$) may be determined.

The relationship set forth in Eq. 3 is affected by temperature of the engine ($T_E$) which may be compensated for. Thus, a temperature-compensated and normalized average engine power during the starting event based upon the battery power load during the starting event may be determined as follows:

$$\overline{P}_{EbT}' = \eta'(T_E)\cdot\overline{P}_B - \overline{P}_L'(T_E) \quad [8]$$

wherein $\overline{P}_{EbT}'$ is the temperature-compensated normalized average engine power during the starting event based upon the battery power load during the starting event, $\eta'(T_E)$ is the temperature-compensated normalized energy efficiency associated with converting electric power to mechanical power, $\overline{P}_B$ is the average battery power load during the starting event, and $\overline{P}_L'(T_E)$ is the temperature-compensated normalized average engine load during the starting event.

Figure 4:
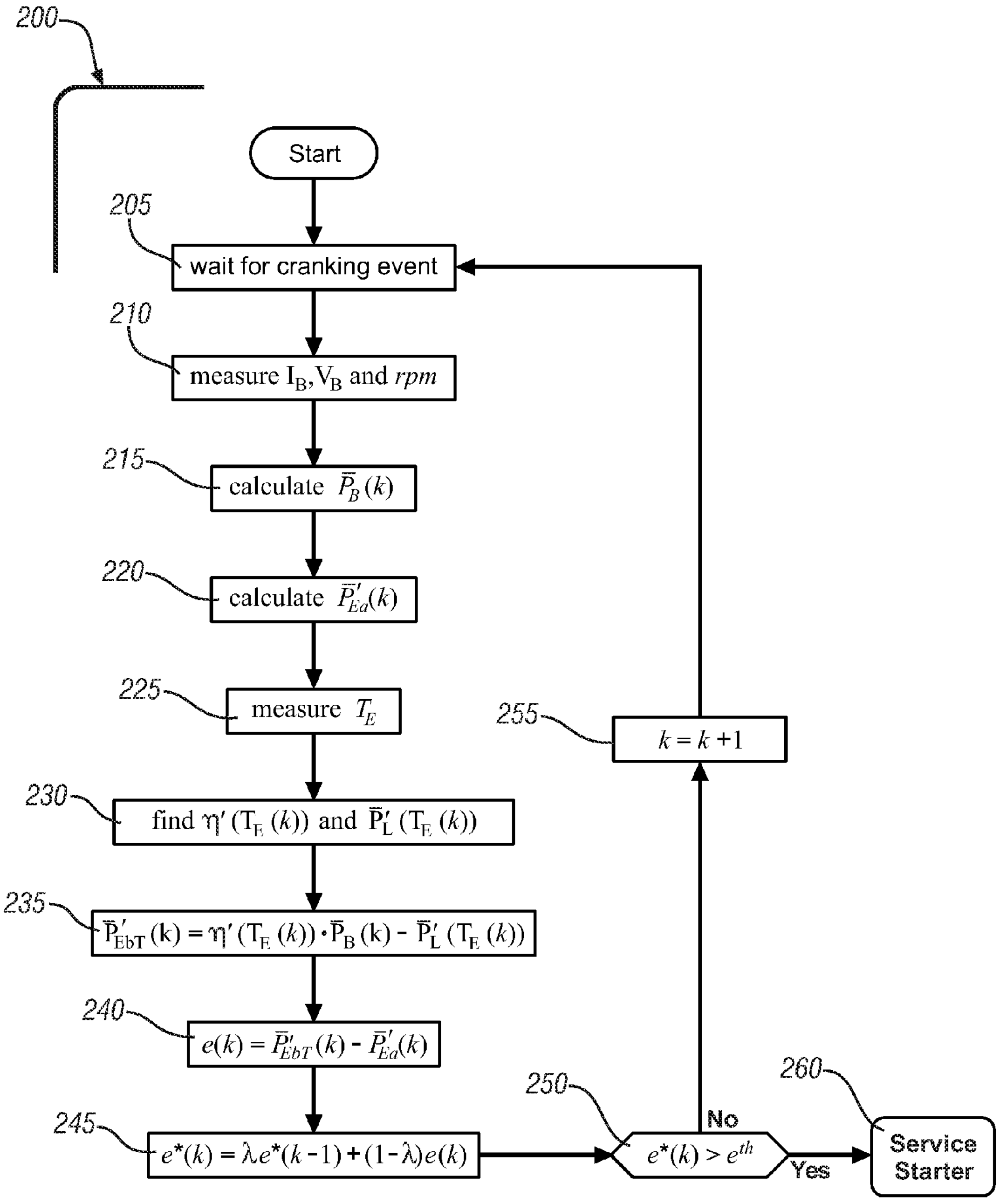
FIG. 4 shows a process depicted in flowchart form for monitoring operation of the starter motor using equations and information in accordance with the present disclosure.

FIG. 4 shows details of the control scheme 200 depicted in flowchart form for monitoring operation of the starter motor 30 using the equations and information described hereinabove. The element (k) refers to the present starting event. Upon detecting a starting event (205), the battery current ($I_B$), battery voltage ($V_B$), and engine speed (rpm) are monitored and measured throughout the present starting event (210). The average battery power load ($\overline{P}_B$(k)) is then calculated for the present starting event using Eq. 7 (215). The normalized average engine power based on the kinetic energy of the engine ($\overline{P}_{E\alpha}'$(k)) is calculated for the present starting event using Eq. 6 (220). Engine temperature ($T_E$) is determined, preferably by measuring engine coolant temperature (225). The temperature-compensated normalized energy efficiency associated with converting electric power to mechanical power ($\eta'(T_E(k))$) and the temperature-compensated normalized average engine load ($\overline{P}_L'(T_E(k))$) are determined for the present starting event, such as through calibration look-up tables (ie. stored vectors in a memory device in the controller 40) referenced by engine temperature (230). The temperature-compensated normalized average engine power based upon the battery power load ($\overline{P}_{EbT}'$(k)) during the present starting event is calculated using the average battery power load ($\overline{P}_B$ (k)) for the present starting event, the temperature-compensated normalized energy efficiency associated with converting electric power to mechanical power for the present starting event ($\eta'(T_E(k))$) and the temperature-compensated normalized average engine load for the present starting event ($\overline{P}_L'(T_E(k))$) using the relationship set forth in Eq. 8, rewritten as follows to indicate the present starting event (k) (235).

$$\overline{P}_{EbT}'(k) = \eta'(T_E(k))\cdot\overline{P}_B - \overline{P}_L'(T_E(k)) \quad [9]$$

An error term (e(k)) indicating a state of health of the starter 30 is calculated as a difference between temperature-compensated normalized average engine power based upon the battery power load ($\overline{P}_{EbT}'$(k)) during the present starting event calculated as described with reference to Eq. 9, and the normalized average engine power based on the kinetic energy of the engine ($\overline{P}_{E\alpha}'$(k)) calculated as described with reference to Eq. 6 (240). The error term (e(k)) is subjected to statistical filtering, e.g., a first-order weighted averaging filter, to determine a filtered error term (e*(k)) (245), which is compared to a threshold error term ($e^{th}$) to determine whether a fault has been detected (250).

Figure 5:
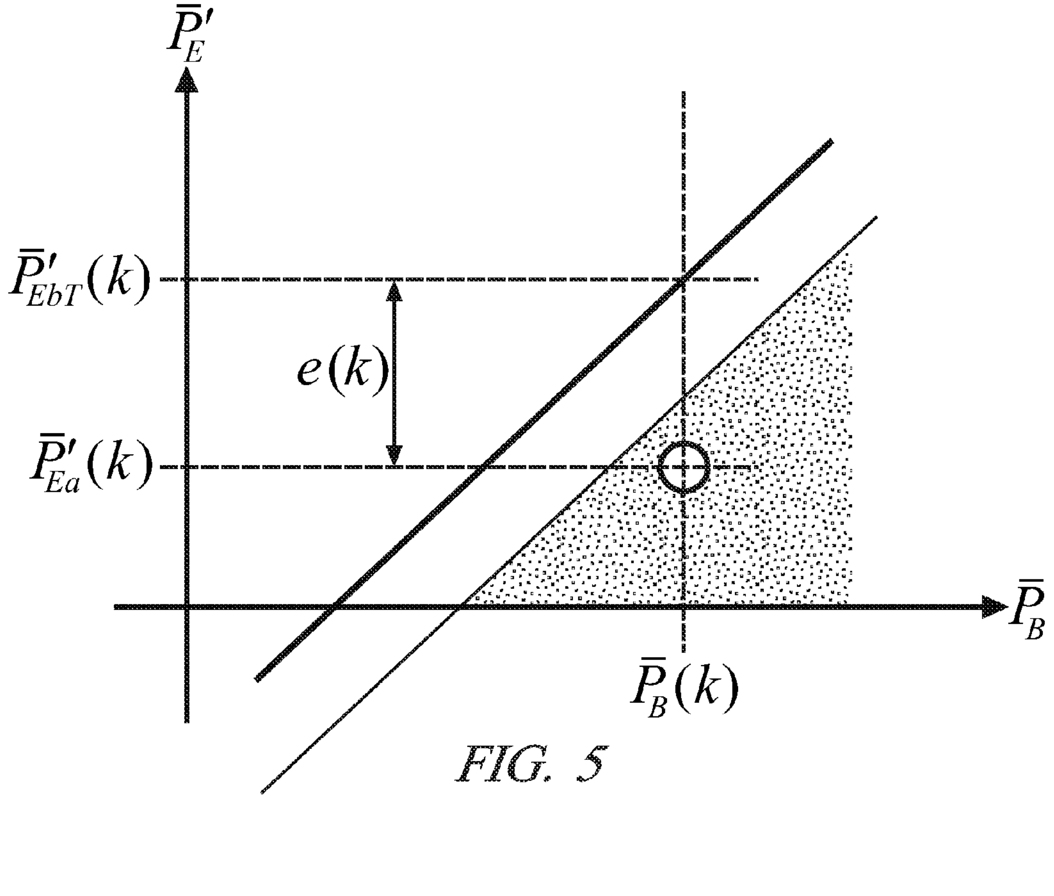
FIG. 5 graphically depicts average normalized engine power and estimated engine power during cranking in relation to the average battery power load in accordance with the present disclosure.

FIG. 5 graphically depicts the temperature-compensated normalized average engine power based upon the battery power load ($\overline{P}_{EbT}'$(k)) and the normalized average engine power based on the kinetic energy of the engine ($\overline{P}_{E\alpha}'$(k)) in relation to the average battery power load ($\overline{P}_B$(k)), and the resulting state of health of the starter 30 as indicated by the error term e(k). The shaded area indicates operating points at which a fault in the starter 30 is indicated and should be detected. When a fault is detected, a fault indicator is set to inform a vehicle operator, e.g., by illuminating a MIL lamp or providing another indicator to indicate a need for servicing the starter motor 30 (260). Otherwise, the state of health of the starter 30 is adjudged acceptable and operation continues to a subsequent iteration of an engine start (255).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a starter motor for an internal combustion engine, comprising:

calculating a first engine power during a starting event based on an electric power flow from the battery to the starter motor;

calculating a second engine power during the starting event based on an engine kinetic energy; and detecting a fault associated with the starter motor as a function of the difference between the first engine power and the second engine power.

2. The method of claim 1, wherein calculating the first engine power during the starting event comprises:

monitoring a temperature of the internal combustion engine;

determining an engine load expected during the starting event corresponding to the temperature of the internal combustion engine; and determining an energy efficiency associated with converting electric power to mechanical power corresponding to the temperature of the internal combustion engine;

wherein the a first engine power during the starting event is further based on the engine load expected and the energy efficiency.

3. The method of claim 2, wherein calculating the first engine power during the starting event comprises calculating the first engine power according to $$\overline{P}_{EbT}' = \eta'(T_E) \cdot \overline{P}_B - \overline{P}_L'(T_E)$$

wherein $\overline{P}_{EbT}'$ is the first engine power, $T_E$ is the temperature of the internal combustion engine, $\eta'(T_E)$ is the energy efficiency associated with converting electric power to mechanical power corresponding to the temperature of the internal combustion engine, $\overline{P}_B$ is the electric power flow from the battery to the starter motor, and $\overline{P}_L'(T_E)$ is the engine load expected during the starting event corresponding to the temperature of the internal combustion engine.

4. The method of claim 1, wherein calculating the second engine power during the starting event comprises:

monitoring a rotational speed of the engine during the starting event; and calculating the engine kinetic energy based on the rotational speed of the engine during the starting event.

5. The method of claim 2, wherein calculating the second engine power during the starting event comprises:

monitoring a rotational speed of the engine during the starting event; and estimating the engine kinetic energy based on the rotational speed of the engine during the starting event.

6. The method of claim 1, wherein the starting event comprises an engine cranking from initiation of the engine cranking until a first local minimum engine speed subsequent to a first local maximum engine speed.

7. The method of claim 2, wherein the starting event comprises an engine cranking from initiation of the engine cranking until a first local minimum engine speed subsequent to a first local maximum engine speed.

8. The method of claim 3, wherein the starting event comprises an engine cranking from initiation of the engine cranking until a first local minimum engine speed subsequent to a first local maximum engine speed.

9. The method of claim 4, wherein the starting event comprises an engine cranking from initiation of the engine cranking until a first local minimum engine speed subsequent to a first local maximum engine speed.

10. The method of claim 5, wherein the starting event comprises an engine cranking from initiation of the engine cranking until a first local minimum engine speed subsequent to a first local maximum engine speed.

11. Method for monitoring a starter motor for an internal combustion engine, comprising:

monitoring a temperature of the internal combustion engine;

monitoring a rotational speed of the engine during a starting event comprising the engine cranking from initiation of the engine cranking until a first local minimum engine speed subsequent to a first local maximum engine speed;

determining an engine load expected during the starting event corresponding to the temperature of the internal combustion engine;

determining an energy efficiency associated with converting electric power to mechanical power corresponding to the temperature of the internal combustion engine;

calculating an electric power flow from the battery to the starter motor during the starting event;

calculating a first engine power during the starting event as a function of said electric power flow, said engine load expected and said energy efficiency;

calculating the engine kinetic energy based on the rotational speed of the engine during the starting event;

calculating a second engine power during the starting event as a function of said engine kinetic energy; and detecting a fault associated with the starter motor as a function of the difference between the first engine power and the second engine power.

12. The method of claim 11, wherein calculating the first engine power during the starting event comprises calculating the first engine power according to $$\overline{P}_{EbT}' = \eta'(T_E) \cdot \overline{P}_B - \overline{P}_L'(T_E)$$

wherein $\overline{P}_{EbT}'$ is the first engine power, $T_E$ is the temperature of the internal combustion engine, $\eta'(T_E)$ is the energy efficiency associated with converting electric power to mechanical power corresponding to the temperature of the internal combustion engine, $\overline{P}_B$ is the electric power flow from the battery to the starter motor, and $\overline{P}_L'(T_E)$ is the engine load expected during the starting event corresponding to the temperature of the internal combustion engine.

13. The method of claim 11, determining the engine load expected during the starting event corresponding to the temperature of the internal combustion engine comprises referencing predetermined engine loads by engine temperature.

14. The method of claim 11, wherein determining the energy efficiency associated with converting electric power to mechanical power corresponding to the temperature of the internal combustion engine comprises referencing predetermined energy efficiencies by engine temperature.

* * * * *